(12) United States Patent
Siomina et al.

(10) Patent No.: US 10,333,635 B2
(45) Date of Patent: Jun. 25, 2019

(54) PERFORMING AND REPORTING RELATIVE RADIO MEASUREMENTS

(71) Applicant: Telefonaktiebolaget L M Ericsson (publ), Stockholm (SE)

(72) Inventors: Iana Siomina, Solna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 682 days.

(21) Appl. No.: 14/556,990

(22) Filed: Dec. 1, 2014

(65) Prior Publication Data

US 2015/0153395 A1 Jun. 4, 2015

Related U.S. Application Data

(60) Provisional application No. 61/911,565, filed on Dec. 4, 2013.

(51) Int. Cl.
*H04W 72/04* (2009.01)
*H04B 17/309* (2015.01)

(52) U.S. Cl.
CPC .................................. *H04B 17/309* (2015.01)

(58) Field of Classification Search
CPC ..... H04W 88/02; H04W 88/08; H04W 24/08; H04W 72/042; H04W 76/023; H04W 72/0446; H04W 24/10; H04W 72/0453; H04L 5/0048; H04L 5/0053; H04L 5/0055; H04L 5/14; H04L 1/00; H04L 47/14

USPC ........ 455/456.1, 226.1, 226.2; 370/252, 329, 370/330, 331, 337, 347

See application file for complete search history.

(56) References Cited

U.S. PATENT DOCUMENTS

| | | | |
|---|---|---|---|
| 8,238,307 B2* | 8/2012 | Yang | H04B 7/0413 370/331 |
| 9,894,672 B2* | 2/2018 | Qin | H04W 72/121 |
| 2011/0014920 A1* | 1/2011 | Nylander | H04W 36/20 455/442 |
| 2011/0063989 A1* | 3/2011 | Yang | H04B 7/022 370/252 |
| 2012/0113816 A1* | 5/2012 | Bhattad | H04L 5/0032 370/246 |

(Continued)

*Primary Examiner* — Alesa Allgood
(74) *Attorney, Agent, or Firm* — Baker Botts, LLP

(57) ABSTRACT

A method in a node is disclosed. The node receives one or more radio signals. The node determines a first measurement component of the one or more radio signals. The first measurement component is associated with a first time-frequency resource type. The node determines a second measurement component of the one or more radio signals. The second measurement component is associated with a second time-frequency resource type. The node determines a relative measurement for the first measurement component associated with the first time-frequency resource type and the second measurement component associated with the second time-frequency resource type. The relative measurement may be a function of the first measurement component associated with the first time-frequency resource type and the second measurement component associated with the second time-frequency resource type. The node performs one or more radio operations using the relative measurement.

21 Claims, 9 Drawing Sheets

(56) References Cited

U.S. PATENT DOCUMENTS

| | | | |
|---|---|---|---|
| 2012/0178462 A1* | 7/2012 | Kim | H04W 72/048 |
| | | | 455/450 |
| 2012/0322453 A1* | 12/2012 | Weng | H04W 72/02 |
| | | | 455/450 |
| 2013/0308485 A1* | 11/2013 | Krishnamurthy | H04W 72/082 |
| | | | 370/252 |
| 2014/0016598 A1* | 1/2014 | Kwon | H04L 5/0023 |
| | | | 370/329 |
| 2014/0078912 A1* | 3/2014 | Park | H04L 5/0048 |
| | | | 370/252 |

* cited by examiner

PERFORMING AND REPORTING RELATIVE RADIO MEASUREMENTS

PRIORITY

This application claims the benefit under 35 U.S.C. § 119(e) of the priority of U.S. Provisional Application 61/911,565 filed on Dec. 4, 2013, entitled "PERFORMING AND REPORTING RELATIVE RADIO MEASUREMENTS," the entire disclosure of which is hereby incorporated by reference.

TECHNICAL FIELD

The present disclosure relates, in general, to wireless communications and, more particularly, to methods and systems for performing and reporting relative radio measurements.

BACKGROUND

The radio measurements performed by a user equipment (UE) can be absolute or relative. Absolute measurements are done on a single cell, or the measurements are not compared with some reference value (i.e., they are not relative to other values). An absolute measurement may also involve two cells, or the measurements done on signals of a cell are not compared with some reference value or reference measurement component. Typically, a relative measurement result is obtained by the UE by comparing the measurements done on any two cells. An example of a relative measurement is a relative signal strength comparing strengths measured on a serving cell and a neighbor cell. The relative measurement quantity can be expressed in linear scale or in log scale. In the former case, the relative measurement quantity is the difference between the two measurement components, and is expressed in dB. A reference value can be pre-defined or configured by a network node.

Currently, only relative timing measurements may be reported by a UE in LTE. More specifically, only reference signal time difference (RSTD) measurements may be reported by a UE in LTE. According to the 3GPP TS 36.214, the RSTD in LTE can be described as the relative timing difference between a neighbour cell j and a reference cell i. It is defined as $T_{SubframeRxj} - T_{SubframeRxi}$ where: $T_{SubframeRxj}$ LS the time when the UE receives the start of one subframe from cell j, and $T_{SubframeRxi}$ is the time when the UE receives the corresponding start of one subframe from cell i that is closest in time to the subframe received from cell j. The reference point for the observed subframe time difference is the antenna connector of the UE. The RSTD is applicable for RRC_CONNECTED intra-frequency and RRC_CONNECTED interfrequency.

Accuracy requirements exist for absolute reference signal received power (RSRP) and absolute reference signal received quality (RSRQ) measurements, as well as for the relative intra-frequency RSRP and relative inter-frequency RSRQ measurements specified in TS 36.133. Currently, these relative measurements are used only for event triggering. An example is event A3, when a neighbor cell becomes offset better than the primary cell, where the cell(s) that triggers the event is on the frequency indicated in the associated measObject, which may be different from the (primary) frequency used by the primary cell. Another example is event A6, when a neighbor becomes offset better than the secondary cell, where the neighbor(s) is on the same frequency as the secondary cell. In other words, both are on the frequency indicated in the associated measObject, and it is therefore important to ensure that the triggering occurs with a sufficient degree of accuracy.

Such requirements for relative intra-frequency RSRP have also been specified for enhanced inter-cell interference coordination (eICIC) and further enhanced inter-cell interference coordination (FeICIC), where RSRQ measurements are restricted to certain subframes indicated by a measurement resource restriction pattern, and the patterns may be different for the primary cell and neighbor cells. RSRP measurements for eICIC/FeICIC are not restricted to subframes indicated by the pattern, unless the RSRP is used to derive an RSRQ measurement, which, however, is not the assumption for deriving relative RSRP requirements for eICIC/FeICIC.

SUMMARY

To address the foregoing problems with existing solutions, disclosed is a method in a node. The node receives one or more radio signals. The node determines a first measurement component of the one or more radio signals. The first measurement component is associated with a first time-frequency resource type. The node determines a second measurement component of the one or more radio signals. The second measurement component is associated with a second time-frequency resource type. The node determines a relative measurement for the first measurement component associated with the first time-frequency resource type and the second measurement component associated with the second time-frequency resource type. The relative measurement may be a function of the first measurement component associated with the first time-frequency resource type and the second measurement component associated with the second time-frequency resource type. The node performs one or more radio operations using the relative measurement.

In certain embodiments, the function of the first measurement component and the second measurement component may be a difference in logarithmic scale or a ratio in linear scale between the first measurement component and the second measurement component, a minimum of the first measurement component and the second measurement component, a maximum of the first measurement component and the second measurement component, or an average of the first measurement component and the second measurement component. In certain embodiments, the first time-frequency resource type may be the same as the second time-frequency resource type. In certain embodiments, one of the first and second measurement components is a reference component. In certain embodiments, the node may send a relative measurement report to a second node. The relative measurement report may include at least one of the relevant measurement and an event associated with the relevant measurement.

Also disclosed is a method in a node. The node receives, from a second node, a relative measurement for a first measurement component and a second measurement component. The first measurement component may be associated with a first time-frequency resource type, and the second measurement component may be associated with a second time-frequency resource type. The relative measurement may be a function of the first measurement component and the second measurement component. The node obtains information about the first time-frequency resource type associated with the first measurement component, and obtains information about the second time-frequency resource type associated with the second measurement component. The node performs a radio operation based at least in part on the information about the first time-frequency resource type associated with the first measurement component and the information about the second time-frequency resource type associated with the second measurement component.

In certain embodiments, the function of the first measurement component and the second measurement component may be a difference in logarithmic scale or a ratio in linear scale between the first measurement component and the second measurement component, a minimum of the first measurement component and the second measurement component, a maximum of the first measurement component and the second measurement component, or an average of the first measurement component and the second measurement component. In certain embodiments, the relative measurement report includes the information about the first time-frequency resource type and the second time-frequency resource type. In certain embodiments, the first and second time frequency resource types are selected from a group including almost-blank (ABS) subframes, MBSFN subframe coinciding with an ABS subframe, subframes indicated by a measurement resource restriction pattern, low interference positioning subframes, subframes for device-to-device communication, subframes used for interference mitigation, subframes used for enhanced coverage or machine type communication.

Certain embodiments of the present disclosure may provide one or more technical advantages. For example, an advantage may be enhanced relative measurement performance and reporting for RRM, SON, MDT, and positioning. Another example may be improved performance of the corresponding features. Yet another example may be that the relative measurement can be done in a shorter time and/or with better accuracy since multiple types of TFRs can be used for the measurement.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
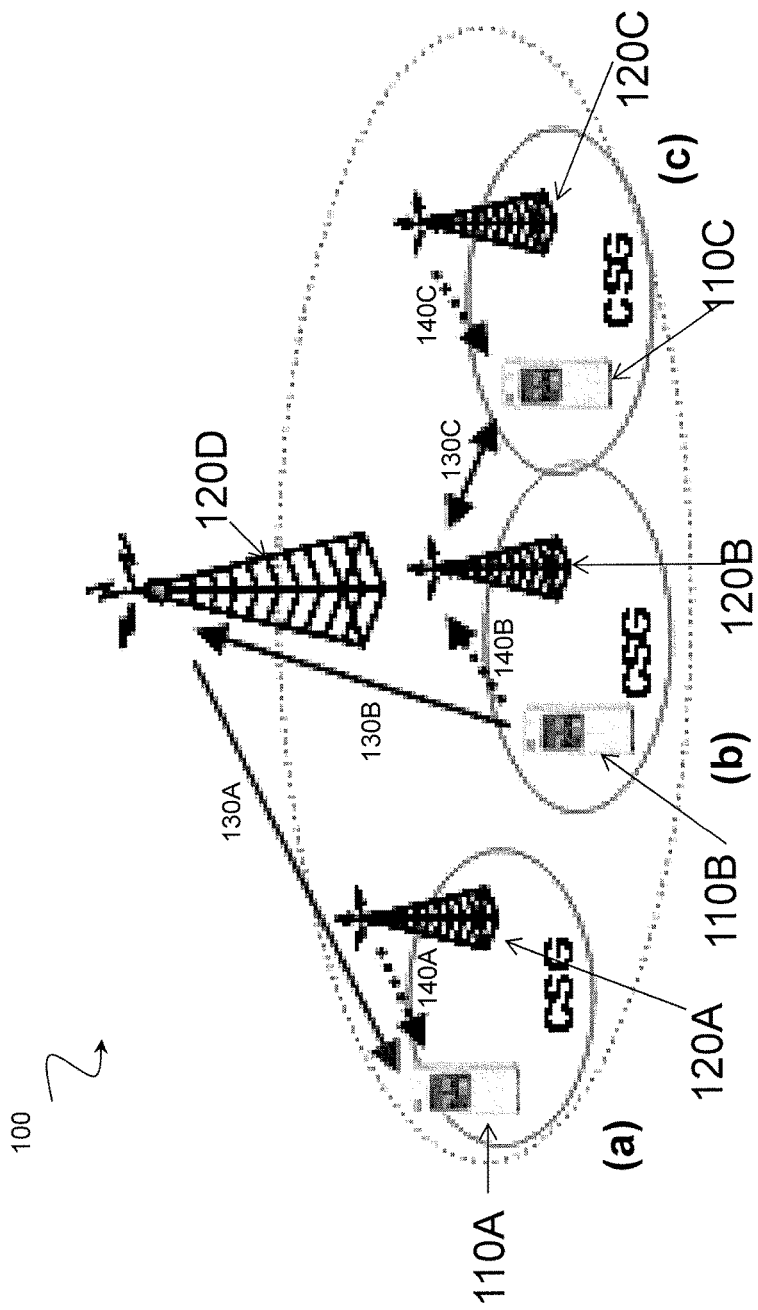
FIG. 1 is a schematic diagram illustrating various interference scenarios in heterogeneous network deployments.

Relative measurements are currently used for general radio resource management (RRM) purposes, such as mobility. Relative measurements may potentially be used for other purposes, such as self-organizing network (SON), MDT, positioning, and other suitable radio operations. The ability to differentiate measurements depending on TFR types, and also to ensure consistent relative measurements and/or control TFR types for different measurement components of a relative measurement is important for RRM in general, positioning, SON, MDT, and features relying on measurement maps that relate one or more measurement results with a geographical location or geographical area, etc. The present disclosure contemplates various embodiments that may improve the performance and reporting of relative radio measurements. The embodiments described in the present disclosure may be combined in different ways.

Different time-frequency resource (TFR) types may be configured in a network. As used herein, TFR may comprise TFR type, TFR configuration, a set of TFRs, etc., and these terms may be used interchangeably in some examples in this disclosure. For example, different TFR types may be configured to create different interference conditions suitable for different types of communication or purposes, different measurement types, or different types of measuring devices. TFR types may include almost-blank subframes in downlink (DL) in heterogeneous network deployments, low-interference positioning subframes, subframes for device-to-device communication, or any other suitable TFR type. Some measurements may be restricted to a specific type of TFR, such as, for example, RSRQ for eICIC/FeICIC, while other measurements may have no such restriction. Different TFR types may have characteristic interference conditions, which may cause a measurement result difference, depending on the TFR type.

The problem may be more severe for relative measurements, which typically involve two measurement components, since different measurement components may happen to be associated with different TFR types, even for the same relative measurement. As one example, a relative measurement may involve two measurements performed on different cells, and the reference measurement may be a function of the two. As one example, the function may be a difference in logarithmic scale or a ratio in linear scale between the first measurement component and the second measurement component, a minimum of the first measurement component and the second measurement component, a maximum of the first measurement component and the second measurement component, an average of the first measurement component and the second measurement component, or any other suitable function. A problem arises when at least two TFR types are present in the radio network, each characterized by different interference conditions. This may result in problems because the node using the relative measurement may be not aware of the TFR associated with the measurement, or each of the measurement components.

As described above, no requirements for relative inter-frequency measurements for eICIC/FeICIC exist since the features were limited to a single frequency only. Hence, effectively, there are currently no relative power-based measurements, such as relative RSRP or relative RSRQ, reported by a UE which are restricted to certain types of TFRs, and there are no requirements for relative power-based measurements restricted to a certain type of TFR. TFRs may be described by patterns. Some examples of such patterns are eICIC/FeICIC patterns (ABS subframes and measurement resource restriction patterns) and positioning patterns comprising periodically repeated positioning subframes. Specifically for heterogeneous deployments, there have been standardized eICIC mechanisms for ensuring that the UE or other wireless device performs at least some measurements (e.g., RRM, RLM and CSI measurements) in low-interference subframes of the interfering cell. These mechanisms involve configuring patterns of low-interference subframes at transmitting nodes, thereby reducing interference, and configuring measurement patterns for UEs, thereby indicating to the UEs low-interference measurement occasions.

Two types of patterns have been defined for eICIC to enable restricted measurements in DL. A first type of pattern is downlink restricted measurement patterns, which are configured by a network node and signaled to the UE. A second type of pattern is transmission patterns, also known as Almost Blank Subframe (ABS) patterns, which are configured by a network node and describe the transmission activity of a radio node. ABS patterns may be exchanged between the radio nodes.

According to TS 36.331 v10.1.0, to enable restricted measurements for RRM (e.g., RSRP/RSRQ), RLM, CSI as well as for demodulation, the UE may receive the following set of patterns via RRC UE-specific signaling. A first pattern is a single RRM/RLM measurement resource restriction for the serving cell. A second pattern is a one RRM measurement resource restriction for neighbour cells (up to 32 cells) per frequency (currently only for the serving frequency). A third pattern is a resource restriction for CSI measurement of the serving cell with 2 subframe subsets configured per UE. Restricted measurement subframes are configured to allow the UE to perform measurements in subframes with improved interference conditions, which may be implemented by configuring ABS patterns at eNodeBs.

An ABS pattern indicates subframes when the eNodeB restricts its transmissions (e.g., does not schedule or transmits at a lower power). The subframes with restricted transmissions are referred to as ABS subframes. In the current standard, eNodeBs can suppress data transmissions in ABS subframes but the ABS subframes cannot be fully blank—at least some of the control channels and physical signals are still transmitted. Examples of control channels that are transmitted in ABS subframes even when no data is transmitted are PBCH and PHICH. Examples of physical signals that have to be transmitted, whether the subframes are ABS or not, are cell-specific reference signals (CRS) and synchronization signals (PSS and SSS). If an MBSFN subframe coincides with an ABS, the subframe is also considered as ABS according to TS 36.423. CRS are not transmitted in MBSFN subframes, except for the first symbol, which allows for avoiding CRS interference from an aggressor cell to the data region of a measured cell. ABS patterns may be exchanged between eNodeBs, e.g., via X2, but these patterns are not signalled to the UE.

FIG. 1 is a schematic diagram illustrating various interference scenarios in heterogeneous network deployments. More particularly, FIG. 1 illustrates a network 100. Network 100 has a plurality of wireless devices 110A, 110B, and 110C, and a plurality of network nodes 120A, 120B, 120C, and 120D. Network nodes 120A-D may be any suitable type of network node, such as a base station, eNodeB, or core network node. Wireless devices 110 may communicate with network nodes 120A-D over a wireless interface. For example, wireless device 110A transmits wireless signals to radio network nodes 120A and 120D and/or receives wireless signals from radio network nodes 120A and 120D. The wireless signals may contain voice traffic, data traffic, and control signals, for example. In certain embodiments, radio network nodes 120A-D may be a core network node, and manage the establishment of communication sessions and various other functionality for wireless devices 110A-C. The network nodes 120A-D may connect through an interconnecting network, which may include any interconnecting system capable of transmitting audio, video, signals, data, messages, or any combination of the preceding. Examples of wireless devices 110A-C and network nodes 120A-D are described with respect to FIGS. 8 and 9, respectively.

In certain embodiments, and as illustrated in FIG. 1, network 100 may be a heterogeneous network. In such an embodiment, radio network nodes 120A-C may be low power nodes, and network node 120D may be a macro-cell node. According to 3GPP, heterogeneous deployments consist of deployments where low power nodes, such as nodes 120A-120C, are placed throughout a macro-cell layout. A heterogeneous deployment such as the one illustrated in FIG. 1 may result in different interference levels. FIG. 1 illustrates various interference scenarios (a), (b), and (c). In the context of FIG. 1, solid lines 130A-C represent intended transmissions, while dotted lines 140A-C represent interference in the uplink or downlink direction.

In order to mitigate the effects of the various interference scenarios illustrated in FIG. 1, resource partitioning in time and frequency may be performed. In certain embodiments, this is accomplished using low interference subframes. In such circumstances, where a UE is transmitting toward a pico cell, such as radio network nodes 120A-C, the UE does not transmit toward the macro radio network node 120D, or vice versa.

In the context of relative measurements, the varying interference levels commonly encountered in a heterogeneous network mean that a first measurement component may have acceptable levels of interference at one point, but unacceptable levels at another. Furthermore, a second measurement component may have completely different interference conditions. The problem may be increased due to the tendency of the interference conditions to change over time. Since the first and second measurement components need to be measured, it is important for the node using the measurement to know the TFR type of each measurement component. Although the various embodiments described below are described in the context of the heterogeneous network illustrated in FIG. 1, the present disclosure contemplates that the described embodiments may be applicable to any suitable network configuration. For example, certain embodiments are applicable to measurements done on cells belonging to any one or more of serving carriers (also known as primary carriers or primary serving carriers), interfrequency carriers, inter-RAT carriers, cells or links belonging to CoMP/RRH, secondary serving carriers in multi-carrier or carrier aggregation, or any other suitable environments.

In certain embodiments, a measuring node may perform a relative radio measurement. In certain embodiments, the measuring node may be a wireless device, such as wireless devices 110A-C. The wireless device that performs the relative radio measurement may be any suitable device. For example, the wireless device may be a UE, a target device, a device used for machine type communication (MTC) (also known as machine to machine communication (M2M)), a device to device (D2D) UE, a customer premises equipment (CPE), or any other suitable device. In certain embodiments, the measuring node may be a radio network node, such as radio network nodes 120A-120D. The radio network node that performs a relative radio measurement may be any suitable radio network node. For example, the radio network node may be a base station, base transceiver station, wireless access node, Wi Fi node, a relay, RNC, BSC, Node B, eNode B, LMU, or any other suitable node.

A measuring node may perform any suitable type of relative radio measurement. For example, the relative measurement may be a power-based relative measurements, such as relative RSRP or relative RSRQ, MBSFN RSRP, MBSFN RSRQ etc). The relative radio measurement may include two measurement components. In certain embodiments, one of the two measurement components may be designated as a reference measurement component. In certain embodiments, the two measurement components of the relative radio measurement may be associated with the same or different TFR sets or TFR types.

In certain embodiments, the measuring node may use the relative radio measurement to perform one or more radio operations. The present disclosure contemplates that the measuring node may use the relative measurement for any suitable operation. As one example, the measuring node may report the relative measurement to a second node. For example, in certain embodiments wireless device 110A may be a measuring node. Wireless device 110A may perform a relative measurement, such as one of the various relative measurements described above, and report the relative measurement to a second node, such as radio network node 120D. In certain other embodiments, radio network node 120D may be the measuring node that performs the relative measurement and reports the relative measurement to a second node. In certain embodiments, the second node may be one of wireless devices 110A-C. The present disclosure contemplates that the measuring node and second node may be any suitable device or node.

In certain embodiments, the report may include the relative measurement or an event associated with the relative measurement. In certain embodiments, the second node, such as radio network node 120D in the example described above, may be aware (via the report or other means) of the TFRs associated with one or more of the measurement components. As another example, the measuring node, such as wireless device 110A described in the example above, may use the performed relative measurement for a measuring node autonomous task. The present disclosure contemplates that the measuring node may use the performed relative measurement for any suitable measuring node autonomous task. For example, the measuring node may use the relative measurement for mobility purposes, such as cell selection, cell reselection, for determining location, for MTC or D2D operation, for SON, positioning, and/or for storing the relative measurement results. As one example, wireless device 110A may be a measuring node that performs a relative measurement and stores the relative measurement results. In certain embodiments, the measuring node may evaluate an event by comparing the relative measurement with a threshold, and reporting the stored results to a second node. As one example, the second node may evaluate an event as part of MDT.

The relative measurement may be performed by the measuring node, such as one of wireless devices 110A-C, in any suitable circumstances. As one example, the relative measurement may be performed upon a trigger in the measuring node. As another example, the relative measurement may be performed by the measuring node upon receiving a measurement request or a message comprising a relative measurement configuration from another node. More particularly, in certain embodiments wireless device 110B may be a measuring node, and wireless device 110B may receive a measurement request from a second node, such as radio network node 120B or 120D. Wireless device 110B may perform a relative measurement upon receiving the measurement request. In certain embodiments, the request may also include an indication of or information about the reference measurement component of the relative measurement.

In certain embodiments, the measuring node may determine the one or more TFR types associated with the measurement components of the relative measurement. In one example, wireless device 110B may be a measuring node, and may determine the one or more TFR types associated with the measurement components of a relative measurement performed by wireless device 110B. In certain embodiments, the TFR types may be known to the second node, such as radio network node 120D, and the measuring node may determine the one or more TFR types associated with the measurement components of the relative measurement in any suitable manner. For example, the one or more TFR types may be determined autonomously by the measuring node, or based on a rule. As another example, the TFR types may be determined based on or by reading from a signaling from the second node, such as a measurement request, a measurement configuration message, a TFR configuration message, or any other suitable signaling from the second node. In certain embodiments, wireless device 110A may receive a measurement request from radio network node 120D, and the measurement request may include information on the one or more TFR types associated with the first and second measurement components. As another example, wireless device 110A, as the measuring node, may determine the TFR types based on or by reading from the signaling from a node other than the second node, such as a serving base station. Thus, in certain embodiments wireless device 110A, as the measuring node, may determine the TFR types based on signaling from a node other than radio network node 120D, such as radio network node 120A. As used in the present disclosure, signaling may mean signaling via physical layer or higher layers, via direct or logical links, or in any other suitable manner.

As described above, the TFR type associated with the first measurement component and the TFR type associated with the second measurement component of a relative measurement may be the same or different. The present disclosure contemplates that the first and second measurement components of the relative measurement may be of any suitable TFR type. As one example, the TFR type of the measurement components may be low-interference subframes for a certain purpose (such as positioning subframes), ABS, MBSFN subframe coinciding with an ABS subframe, or subframes indicated by a measurement resource restriction pattern. As another example, the TFR type may be any time (e.g., subframes or radio frames) and/or frequency (e.g., one or more resource block within the channel bandwidth or carrier frequency) resources characterized by certain interference conditions, such as the interference conditions illustrated in FIG. 1. Other examples of TFR types include subframes used for interference mitigation, machine type communication (MTC), subframes for device-to-device communication, subframes used for enhanced coverage or machine type communication, subframes used for interference mitigation, or any other suitable TFR type.

As described above, the measuring node, such as wireless device 110A or radio network node 120D, may receive information about the TFR types associated with the measurement components. The information about TFR types associated with the measurement components of a relative measurement may include any suitable information. For example, the information may include an explicit TFR configuration, or a set of TFRs or TFR type associated with at least one measurement component. In certain embodiments, the TFR configuration may include an identifier of TFRs, such as subframe numbers, bandwidth of the resources (such as BW of RBs within TFRs), or any other suitable identifier. As another example, the information may include an indication of whether the TFR configuration or TFR type is the same for both measurement components. In certain embodiments, the information about the TFR types associated with the relative measurement may be included implicitly or explicitly in a measurement report signaled to the second node. For example, wireless device 110A, as measuring node, may signal a measurement report including some or all of the above described information to a second node, such as radio network node 120D. The information about the TFRs may also indicate the type of TFR used for different components used for deriving the relative measurements.

As described above, a measuring node, such as wireless devices 110A-C or radio network nodes 120A-D, may report a relative measurement to a second node. As described above, in certain embodiments, the second node may be a wireless device, such as wireless devices 110A-C, or a radio network node, such as radio network nodes 120A-D. In certain embodiments, the second node may be a radio network node such as a base station, or a network node, such as an MME, a positioning node, an O&M node, an MDT node, or other core network node. In certain embodiments, the second node may be a non-serving node, such as an RRH, a non-serving CoMP node, or any other suitable node.

In certain embodiments, the second node may obtain information about the TFR types associated with each of the measurement components of the relative measurement performed by the measuring node. In certain embodiments, the second node may use this information for one or more radio operations. The present disclosure contemplates that the second node may use this information for any suitable radio operation. For example, the second node may use the relative radio measurement for RRM tasks, MDT, SON, D2D, MTC, positioning, storing this information in a database, or signalling the information to other nodes. In certain embodiments, wireless device 110A may be the second node, and wireless device 110A may use information about the TFR types associated with each of the measurement components of a relative measurement performed by a measuring node such as radio network node 120D. Wireless device 110A may then use the obtained information to perform one or more radio operations, such as the radio operations described above, or any other suitable radio operation.

The second node may obtain information about the TFR types associated with the relative measurement in any suitable manner. As described above, the TFRs may be the same or different for different components of the relative measurement. In certain embodiments, information or an indication about the TFRs associated with the measurement may be obtained from a relative measurement report signaled to the second node from the measuring node. For example, in certain embodiments, wireless device 110A, as measuring node, may signal a relative measurement report to radio network 120D, as the second node. The measurement report may include information or an indication about the TFRs associated with the relative measurement performed by wireless device 110A, and radio network node 120D, as the second node, may obtain that information from the measurement report. In certain embodiments, the second node may receive the measurement configuration information or an indication about the TFRs associated with the measurement from a node configuring TFRs and/or measurements in the measuring node. In certain embodiments, the second node may receive transmission configuration information or an indication about the TFRs associated with the measurement from the transmitting node, such as a wireless device or base station.

In certain embodiments, the second node may always assume that the measurement is performed in the TFRs, or assume so unless it receives different information from the measuring node. In certain embodiments, the second node applies a rule to determine the TFRs associated with the received measurement.

The second node, upon obtaining this information, may use it for one or more radio operations. For example it may use the information for RRM tasks, D2D or MTC operation, SON, MDT, positioning, storing this information in a database, signaling the information to other nodes, or other suitable tasks. In certain embodiments, RRM tasks may include configuring transmission parameters in the radio nodes, such as changing the number of low interference subframes, which are used for low interference measurements.

In certain embodiments, the TFRs associated with relative measurement performed by a measuring node, such as, for example, wireless device 110A, may be controlled. In general, this may be based on signaling from another node, conditional triggers in the measuring node, a pre-defined rule, or any combination thereof. The signaling may be from any suitable source. As one example, the signaling may be from the second node. As described above, in certain embodiments the second node may be radio network node 120D. In certain embodiments, the signaling may be from a network node, such as an SON node, O&M node, positioning node, MDT node, a node configuring relative measurements for the measuring node, or any other suitable network node. As another example, the signaling may come from a radio network node, or a wireless device.

The present disclosure contemplates the use of any suitable signaling for controlling the TFRs associated with a relative measurement. As one example, an explicit TFR configuration(s) may be signaled to the measuring node for at least one measurement component. As another example, an indication of whether the same TFRs should be used for both components of the relative measurement may be signaled to the measuring node. As yet another example, a condition determining when the same or different TFRs can be used for different components of the relative measurement may be signaled to the measuring node. In certain embodiments, a pre-defined rule may be applied in the measuring node to determine whether the same or different TFRs, or in a specific example, TFR types, can be used for different components of the relative measurement. In such an embodiment, the relative measurement is performed such that it corresponds with the applied pre-defined rule.

In certain embodiments, the relative measurement done by the measuring node, such as wireless device 110A, may be governed by one or more rules. The one or more rules governing the relative measurement may be pre-defined or configured by another node. For example, the relative measurement may be governed by rules which are pre-defined or configured by a network node, such as radio network node 120D.

In certain embodiments, measurement components of a relative measurement may be measured on radio signals transmitted by the same radio node. The radio node may be a base station, a relay node, a wireless access node, a beacon node, a wireless device, or any other suitable node or device. In such an embodiment, the measuring node may compare the measurements done on two different TFR sets or TFR types. For example, the measuring node, such as wireless device 110A, may obtain the relative measurement quantity by comparing the measurement done in restricted measurement subframes with the same type of measurement done in PRS subframes. In certain embodiments, the relative measurement may be a function of the first measurement component done in restricted measurement subframes and the second measurement component done in PRS subframes. More particularly, the relative measurement may be the difference between the two values expressed in dB, such as relative RSRP in dB. The relative measurement results may then be used for one or more radio operations. For example, the relative measurement results may be used for RRM tasks, D2D or MTC operation, positioning, SON, MDT, reporting to the second node, using it for determining positioning, triggering an event by comparing it with a threshold etc.

In certain embodiments, the measurement components measured on same type of radio signals can be compared, even though the measurement involves two or more different types of TFRs. For example, assume low interference relative RSRP/RSRQ measurements are configured to be measured between a serving cell, such as radio network node 120D, and one or more neighbouring cells, such as radio network node 120A, in restricted measurement subframes and PRS subframes. In such circumstances, the measuring device, such as wireless device 110A, may obtain the first part of the relative measurement by comparing the RSRP measurements done in restricted measurement subframes in the serving cell 120D and the neighbour cell 120A. In certain embodiments, the first component of the relative measurement may be obtained in one or multiple TFRs. The measuring device 110A may obtain the second component of the relative measurement by comparing the RSRP measurements done in PRS subframes in the serving cell 120D and the neighbour cell 120A. The second component of the measurement may be obtained in one or multiple TFRs. The measuring device 110A may then obtain the overall or the combined relative measurement by combining the first and the second components of the relative measurement. The combining can be based on any suitable function, such as an average, maximum, or minimum.

In certain embodiments, the measurement components may be measured on radio signals transmitted by different radio nodes, such as different base stations, different antennas, different RRHs, different wireless devices, or any other suitable radio nodes. For example, wireless device 110C, as measuring node, may perform a relative measurement using measurement components derived from radio signals 130C and 140C transmitted by radio network nodes 120B and 120C, respectively. In such an embodiment, the two measurement components may be measured on the same or different TFR sets, or the same or different types of TFRs.

In certain embodiments, the relative measurement may be allowed to compare measurement components, provided they are obtained within a certain time period. As one example, it may be pre-defined that the measuring node is allowed to compare the measurement components if they are obtained within the periodicity of the pattern of restricted measurement subframes (e.g. 40 ms) and/or within the periodicity of the PRS positioning occasion (e.g. 320 ms). In certain embodiments, the measurement components may be obtained according to any of the embodiments described herein. For example, the measurement components for deriving relative measurement may belong to the same or different TRFs in the same or different cells.

In certain embodiments, the relative measurement may be performed during a cell change. The present disclosure contemplates various ways for performing a relative measurement during cell change. Examples of cell change may include handover, RRC connection re-establishment, RRC connection release with redirection, PCell change in CA, or PCC change in PCC. In RRC idle state or low activity RRC state, an example of cell change is cell reselection. The cell change may or may not result in changed TFRs. As one example, if the low-interference subframes pattern is defined for all cells on carrier frequency, then an intra-frequency handover does not cause a TFR change, but inter-frequency handover may. For instance, in one example a first low-interference subframes pattern may include subframe #0 configured for all cells on a first carrier frequency, f1. The carrier frequency f1 may be used by all three CSG cells (120A-C) illustrated in FIG. 1. In such a case, the intra-frequency handover (i.e., handover between cells in f1) will not change the TFR. In other words, the TFR remains subframe #0. In another example, a second low-interference subframes pattern may include subframe #5 configured for all cells on a second carrier frequency, f2. The carrier frequency f2 may be used by macro cell 120D. In this example, the inter-frequency handover (i.e. handover from serving cell on f1 to a cell on f2), will require a UE, such as wireless device 110, to perform relative measurement by measuring on TFR for f1 (i.e., subframe #0) and on TFR for f2 (i.e., subframe #5).

In certain embodiments, the cell change may cause TFR change for one of the measurement components only. For example, in such an embodiment, the measuring node may restart or may continue the relative measurement. If the measurement continues, the less stringent requirement from the applicable requirements before and after the cell change shall apply. As another example, the measurement may continue if one of the measurement components is the reference component. As yet another example, if the relative measurement is done on neighbour cells (i.e. not involving serving cell), then the measuring node may continue doing the relative measurement after the cell change.

In certain embodiments, the cell change causes TFR change for both measurement components. In such an embodiment, the measuring node will restart the relative measurement.

In certain embodiments, if the relative measurement involves certain types of TFRs, such as restricted subframes and PRS, then the measuring node may continue doing the ongoing relative measurement after the cell change. In certain embodiments, if the relative measurement involves only one type of TFR, such as PRS subframes, then the measuring node may continue doing the ongoing relative measurement after the cell change.

In certain embodiments, the measuring node may continue doing the ongoing relative measurement after the cell change, provided the relative measurement is done according to certain mechanisms of the configuration or assistance information is sent to the measuring node. For example, in certain embodiments the relative measurement may continue after cell change, provided the configuration or assistance information for all types of TFRs involved in the measurement are sent by the same node, such as a positioning node. As another example, the relative measurement may continue after cell change, provided the configuration or assistance information for all types of TFRs involved in the measurement are sent by specific type of node, such as base station or serving cell etc.

In certain embodiments, if the measurement configurations associated with all the TFRs involved in the relative measurement do not change after the cell change, only then may the measuring node continue doing the ongoing relative measurement after the cell change. In certain embodiments, the measuring node can continue doing the ongoing relative measurement after the cell change using only those TFRs whose measurement configuration does not change after the cell change. In such an embodiment, it may also be pre-defined how the measuring node will meet one or more pre-defined requirements. For example, one of the pre-defined rules may be that the measuring node shall meet one or more pre-defined requirements associated with the TFRs (out of different types of TFRs involved in the relative measurement) which lead to less stringent pre-defined requirements, such as, for example, longer measurement time. As another example, the pre-defined rule may be that the measuring node shall meet one or more pre-defined requirements associated with the type of TFRs (out of different types of TFRs involved in the relative measurement) that are used after the cell change, or the TFR used after the last cell change, or the TFR which is used after most of the cell changes over the measurement time of the relative measurement.

In certain embodiments, the relative measurements performed according to the rules and/or configuration described above may be required to meet one or more pre-defined requirements. These rules may also be implicitly realized in the measuring node by its compliance with the pre-defined requirements described herein. These requirements are pre-defined in 3GPP specifications, and their compliance by the UE is ensured by means of conformance testing procedures. For example, the pre-defined requirements (such as, for example, measurement requirements, performance requirements, or RRM requirements) related to measurements may be cell identification delay (e.g. 10 seconds), physical layer measurement period or measurement time (e.g. 2 seconds), or physical layer measurement time, measurement reporting delay, measurement reporting time, measurement accuracy, number of identified cells required to be measured by the UE (e.g. 8 cells per carrier), reporting criteria, or number of measurements that can be done in parallel by the measuring node, applicable signal quality target for measuring a cell (e.g. SCH Es/Iot≥−6 dB; CRS Es/Iot≥−6 dB, RSRP≥−127 dBm for band 1; SCH_RP≥−127 dBm for band 1), or any other suitable pre-defined requirement.

Another example rule may be that one set of requirements apply when one or more specific parameters of TFR configuration (e.g., periodicity) for two measurement components are the same or similar (not too different), and another set of requirements may apply when certain parameters (e.g., periodicity) are different, such as, for example, the less stringent requirements of the requirements for each of the measurement components apply.

Although particular examples provided above may describe a particular wireless device or node serving as the measuring node, the second node, or various other features of the described embodiments, these are non-limiting examples. The present disclosure contemplates that in connection with the various embodiments described above, any suitable device, node, or other component may be the described measuring node, second node, or any other described feature.

Figure 2:
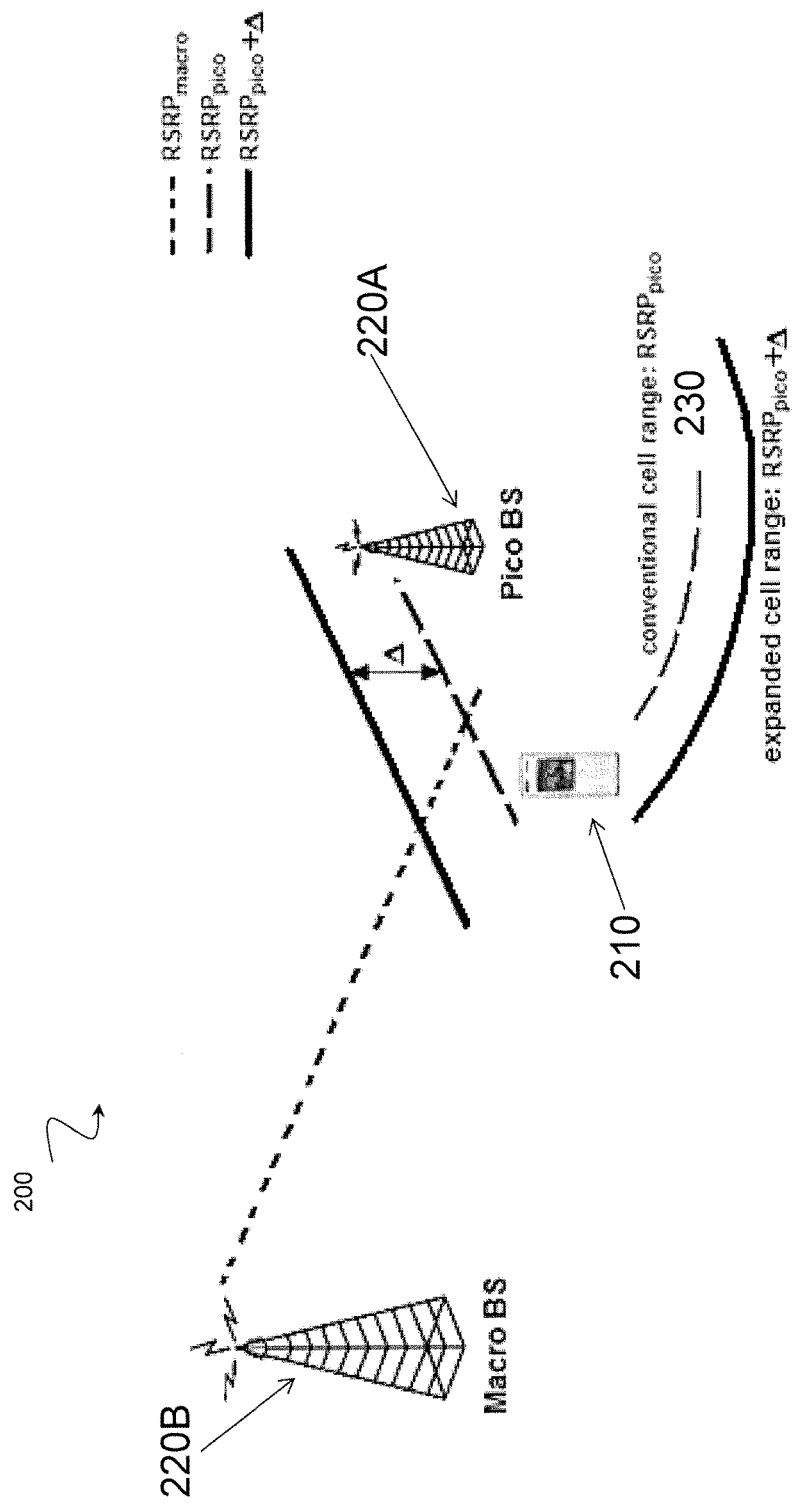
FIG. 2 is a schematic diagram of cell range expansion in heterogeneous networks.

FIG. 2 is a schematic diagram of cell range expansion in heterogeneous networks. FIG. 2 illustrates a network 200 having a wireless device 210 and two radio network nodes 220A and 220B. In certain embodiments, network 200 may be a heterogeneous network, similar to network 100 discussed above. In certain embodiments, radio network node 220A may be a pico base station, and radio network node 220B may be a macro base station. FIG. 2 illustrates a challenging interference scenario in a heterogeneous network that may occur with so-called cell range expansion. As wireless device 210 moves farther beyond the cell border 230, it is still being served by cell 220A. In doing so, the signal from the serving cell 220A becomes weaker, while the signal of the interfering link becomes stronger. The result is a degradation of interference conditions for wireless device 210.

In cell range expansion, the traditional downlink cell assignment rule may diverge from the RSRP-based approach, towards a pathloss- or pathgain-based approach. Such a scenario may occur when adopted for cells with a transmit power lower than neighbour cells. The cell range expansion may be done in combination with the heterogeneous network configuration illustrated in FIG. 1, or may be implemented independently. The present disclosure contemplates that the various embodiments described above in relation to FIG. 1 may be applied to the scenario illustrated in FIG. 2.

For example, in certain embodiments wireless device 210 may be a measuring node, and may perform relative measurements on radio signals from one or both of radio network nodes 220A and 220B. In certain embodiments, wireless device 210 may use the relative measurement to perform one or more radio operations, such as the radio operations described above in relation to FIG. 1. As one example, wireless device 210 may store the relative measurement. As another example, wireless device 210 may report the relative measurement to a second node, such as radio network node 220A or 220B. In certain embodiments, wireless device 210 may perform a relative measurement during a cell change, such as, for example, during handover from radio network node 220A to radio network node 220B. In certain other embodiments, one of radio network node 220A or 220B may be a measuring node, and wireless device 210 may be the second node. In such an embodiment, one or both of radio network nodes 220A or 220B may perform a relative measurement.

Figure 3:
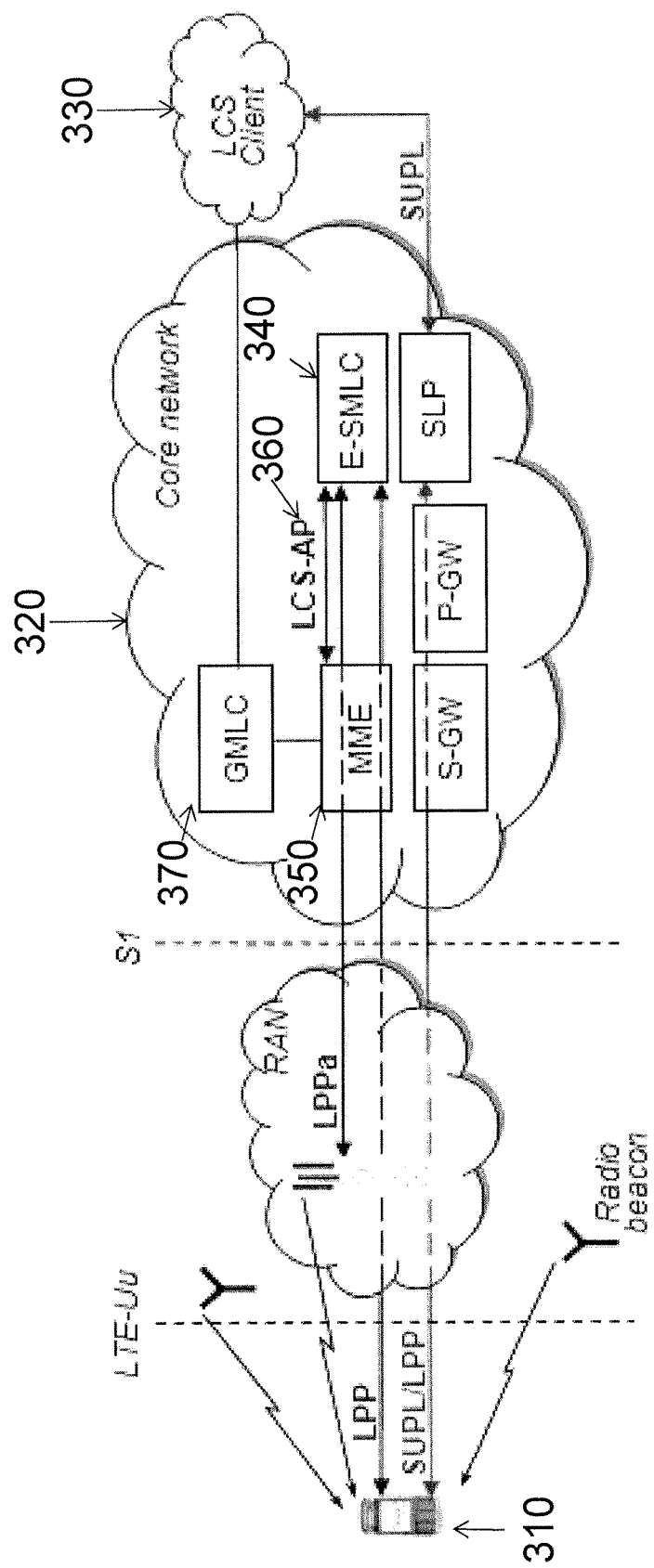
FIG. 3 is a schematic diagram of an example positioning architecture in LTE.

FIG. 3 is a schematic diagram of an example positioning architecture in LTE. More particularly, FIG. 3 illustrates a target device 310, an LCS Server 320, and an LCS Client 330. Target device 310 may be a wireless device or UE, such as wireless device 110A illustrated in FIG. 3, a mobile relay, a PDA, a wireless device for machine type communication (also known as machine to machine communication), a laptop mounting wireless devices or equipment, or any other suitable device. LCS Server 320 may be a physical or logical entity managing positioning for LCS target device 310 by collecting measurements and other location information, assisting the terminal in measurements when necessary, and estimating LCS target 310's location. LCS Client 330 may be a software and/or hardware entity that interacts with LCS Server 320 for the purpose of obtaining location information for one or more LCS targets 310 (i.e., the entities being positioned). In certain embodiments, LCS Client 330 may reside in the LCS target 310. In certain embodiments, LCS Client 330 may send a request to LCS Server 320 to obtain location information, and LCS Server 320 may process and serve the received requests, and send the positioning result and optionally a velocity estimate to the LCS Client 330. In certain embodiments, a positioning request can be originated from the terminal or a network node or external client.

In general, there are several positioning methods for determining the location of a target device. The position of target device 310 is determined by using one or more positioning measurements. Positioning measurements may be performed by any suitable measuring node or the target device. For example, depending upon the positioning method used, the measuring node may be the target device 310 itself, a separate radio node (i.e. a standalone node), a serving and/or neighboring node of the target device, or any other suitable device or node. Depending upon the positioning method, the measurements can be performed by one or more types of measuring nodes. Positioning measurements may be relative measurements described above in relation to FIG. 1. The present disclosure contemplates that the various embodiments relating to relative measurements described above may be applicable to positioning measurements.

The LTE architecture explicitly supports location services by defining the Evolved Serving Mobile Location Center (E-SMLC) 340 that is connected to the core network (i.e. Mobility Management Entity (MME) 350) via the so called LCS-AP interface 360 and the Gateway Mobile Location Center (GMLC) 370 that is connected to MME 350 via the standardized Lg interface. The LTE system supports a range of methods to locate the position of target device 310 within the coverage area of the RAN. These methods differ in accuracy and availability. Typically, satellite based methods, such as Assisted GNSS, are accurate within a few meters of resolution, but may not be available in indoor environments. On the other hand, Cell ID based methods are much less accurate, but have high availability. Thus, LTE uses A-GPS as the primary method for positioning, while Cell-ID and OTDOA based schemes serve as fallback methods.

In LTE, the positioning node, also known as E-SMLC 340 or location server, configures target device 310 to perform one or more positioning measurements, depending upon the positioning method. In certain embodiments, target device 310 may be a wireless device, such as wireless device 110 described above in relation to FIG. 1, a UE, eNode B, or radio node dedicated for positioning measurements such as, for example, an LMU. The positioning measurements, which may be relative measurements, may be used by target device 310, by a measuring node, such as the various measuring nodes described above in relation to FIG. 1, or by the positioning node to determine the location of target device 310. In LTE, the positioning node communicates with target device 310 using LTE positioning protocol (LPP) and with eNode B using LTE positioning protocol annex (LPPa).

Figure 4:
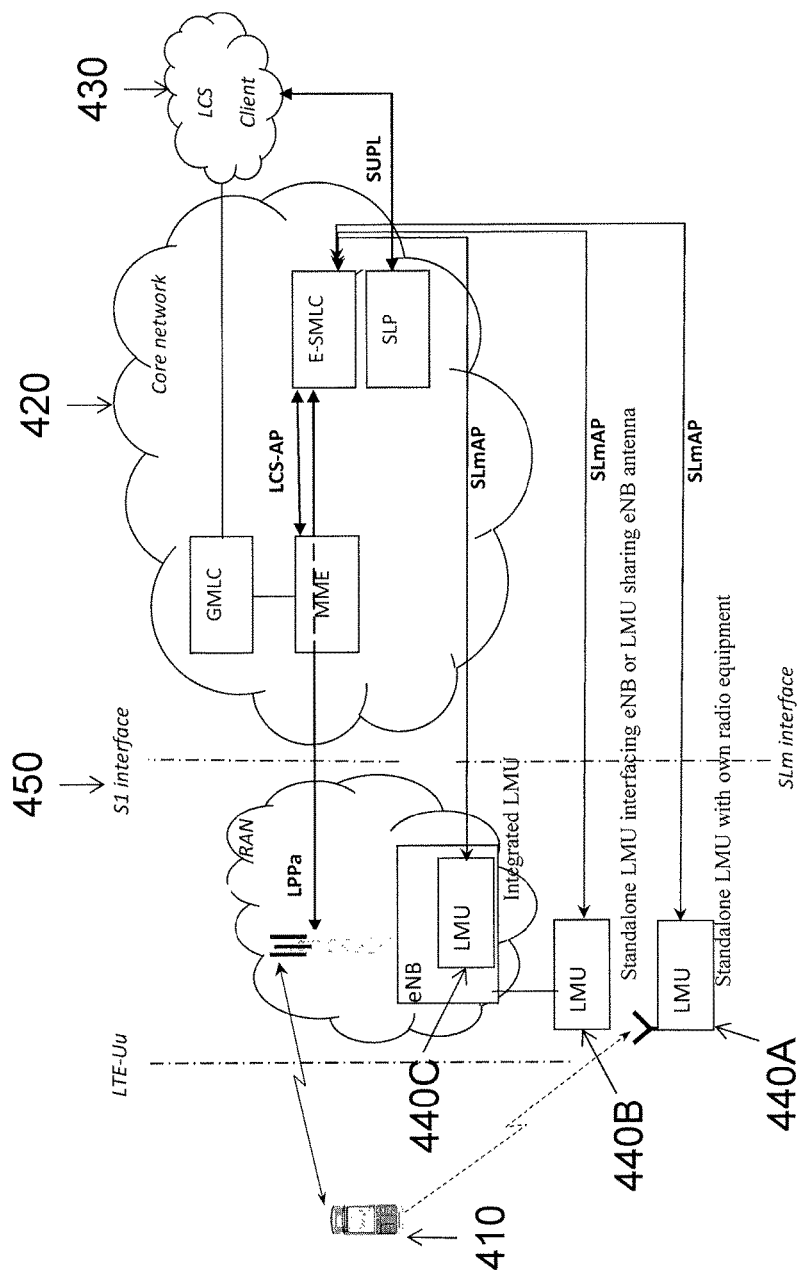
FIG. 4 is a schematic diagram of an example positioning architecture in LTE with LMU nodes.

FIG. 4 is a schematic diagram of an example positioning architecture in LTE with LMU nodes. More particularly, FIG. 4 illustrates an architecture for uplink (UL) positioning, such as, for example, uplink-time difference of arrival (UTDOA). FIG. 4 includes a target device 410, an LCS server 420, and an LCS client 430. In certain embodiments, target device 410, LCS server 420, and LCS client 430 have the same or similar characteristics as target device 310, LCS server 320, and LCS client 330 described above in relation to FIG. 3. Also illustrated are a plurality of location measurement units (LMUs) 440A-C.

Although UL measurements may in principle be performed by any radio network node, such as, for example, an eNodeB, UL positioning architecture may include specific UL measurement units. In certain embodiments, and as illustrated in FIG. 4, the UL measurement units may be LMUs 440A-C. LMUs 440 may be logical and/or physical nodes, such as LMU 440A, or may be integrated with radio base stations or sharing some of the software or hardware equipment with radio base stations, such as LMU 440B, or may be completely standalone nodes with their own equipment (including antennas), such as LMU 440C. There is an interface, SLm 450, between the E-SMLC 460 and LMUs 440. The interface is terminated between a positioning server (E-SMLC 460) and LMU 440. The interface is used to transport SLmAP protocol messages over the E-SMLC-to-LMU interface. SLmAP protocol messages are part of a protocol being specified for UL positioning. As described above, several LMU deployment options are possible. As one example, LMU 440C may be a standalone physical node. As another example, LMU 440B may be integrated into an eNodeB. As yet another example, LMU 440A may share at least some equipment, such as antennas, with an eNodeB.

As described above, positioning measurements may be relative measurements. In certain embodiments, positioning measurements may be performed on a variety of radio signals. For example, positioning measurements may be performed on DL radio signals (e.g., CRS or PRS), signals transmitted by a radio network node, UL radio signals (e.g., Sounding Reference Signals SRS), signals transmitted by a wireless device to a network, signals transmitted by a wireless device to another wireless device, or satellite radio signals. Positioning measurements may be intra-frequency, inter-frequency, or inter-RAT. In certain embodiments, positioning measurements may be performed by a measuring node, which may be a wireless device, a radio base station, or other radio nodes, such as, for example, LMUs. Position calculation can be conducted, for example, by a positioning server (e.g. E-SMLC or SLP in LTE) or UE. The former approach corresponds to the UE-assisted positioning mode when it is based on UE measurements, whilst the latter corresponds to the UE-based positioning mode.

Figure 5:
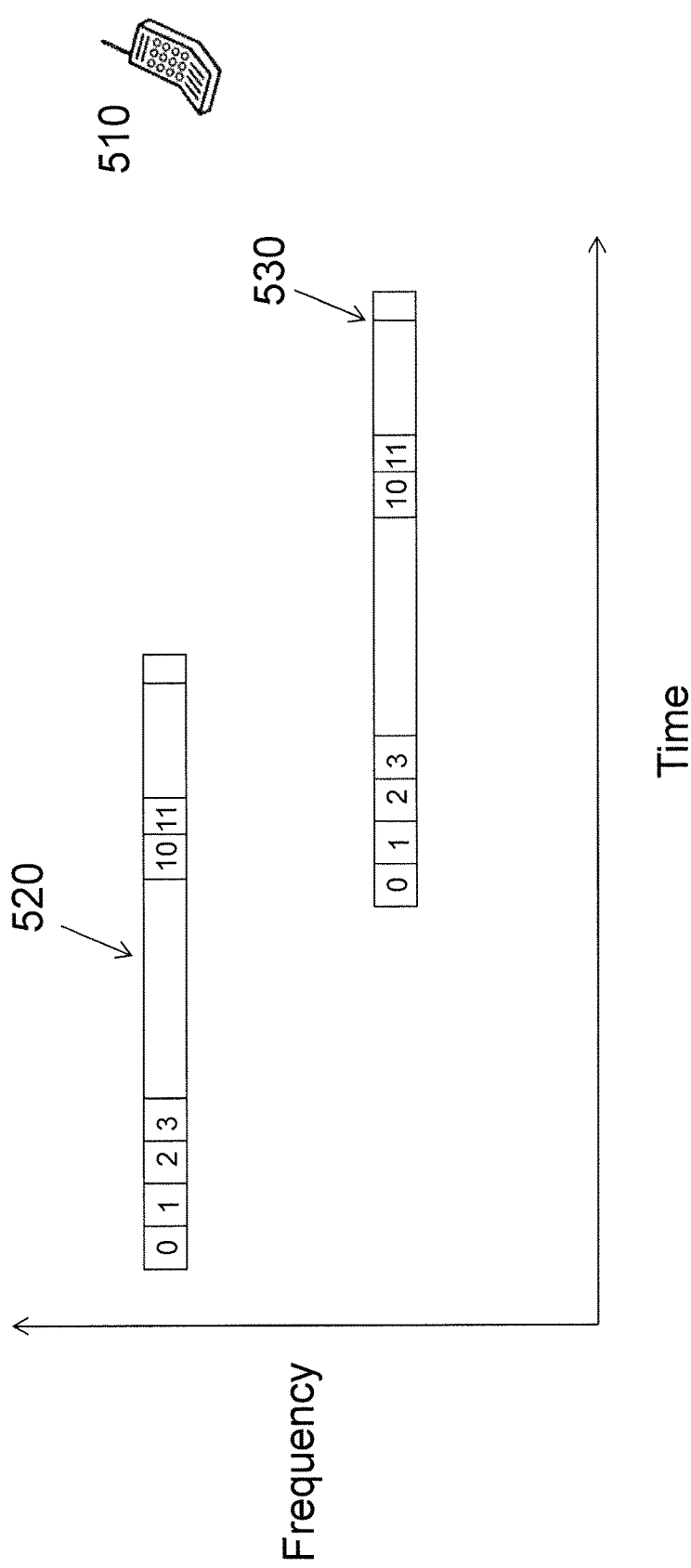
FIG. 5 is an illustration of a first measurement component and a second measurement component having different time-frequency resource types, according to a particular embodiment.

FIG. 5 is an illustration of a first measurement component and a second measurement component having different time-frequency resource types, according to a particular embodiment. More particularly, FIG. 5 illustrates wireless device 510, a first measurement component 520 and a second measurement component 530. In certain embodiments, first measurement component 520 has a first TFR type associated with it, and second measurement component 530 may have a second TFR type associated with it. In certain embodiments, and as illustrated in FIG. 5, the first TFR type and the second TFR type may be different. In certain other embodiments, the first and second TFR types may be the same.

In certain embodiments, wireless device 510 may perform a relative measurement of first measurement component 520 and second measurement component 530. In certain embodiments, the relative measurement may comprise a function of first measurement component 520 and second measurement component 530. In certain embodiments, the function may be a difference in logarithmic scale or a ratio in linear scale between first measurement component 520 associated with the first time-frequency resource type and the second measurement component 530 associated with the second time-frequency resource type, a minimum of first measurement component 520 and second measurement component 530, a maximum of first measurement component 520 and second measurement component 530, or an average of first measurement component 520 and second measurement component 530. In certain embodiments, the relative measurement may be performed in accordance with the various embodiments described above in relation to FIG. 1.

Figure 6:
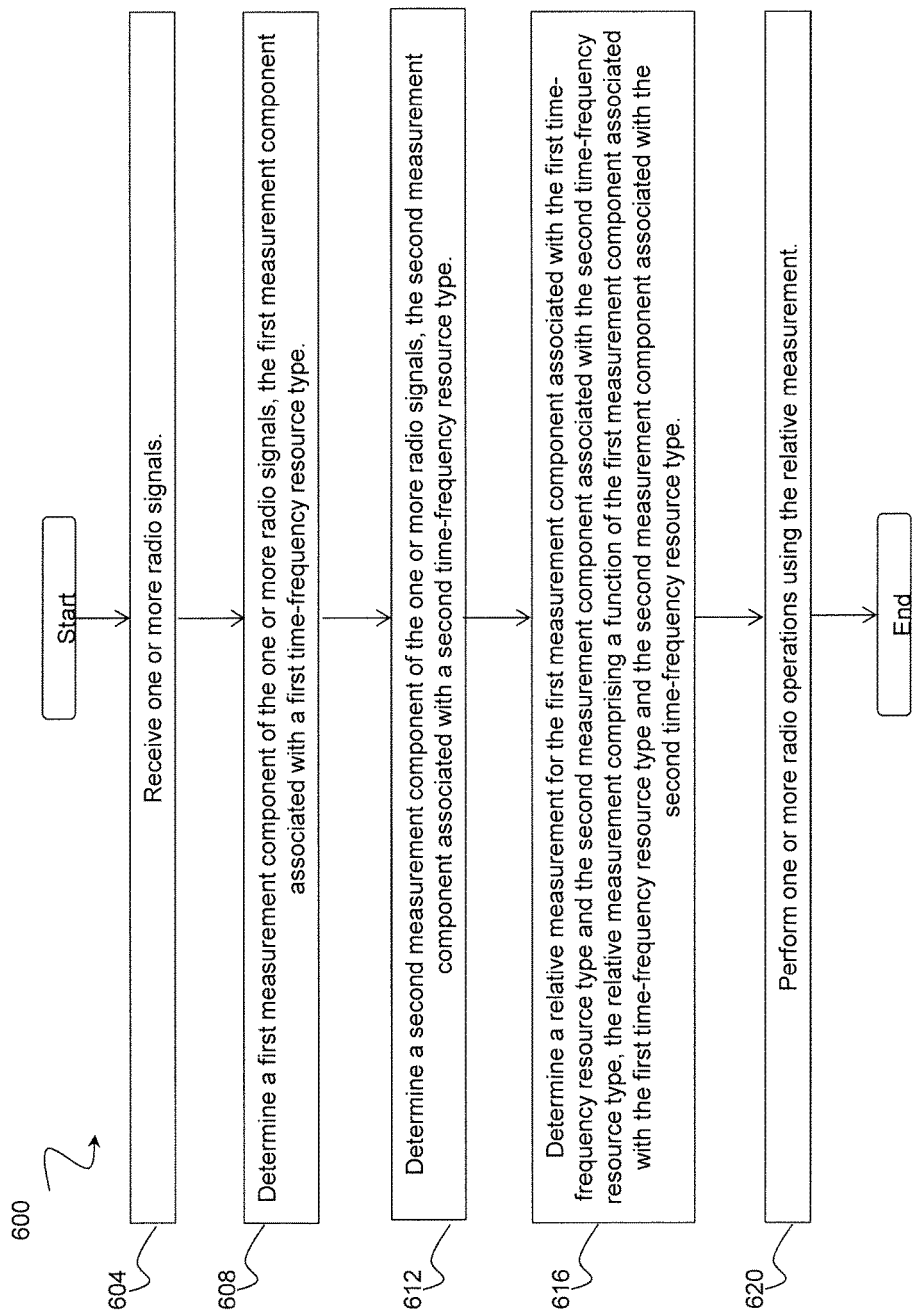
FIG. 6 is a flow diagram illustrating an example method in a network node, according to a particular embodiment.

FIG. 6 is a flow diagram illustrating an example method 600 in a node, according to a particular embodiment. The method begins at step 604, where the node receives one or more radio signals. In certain embodiments, the node may be a user equipment. At step 608, the node determines a first measurement component of the one or more radio signals. In certain embodiments, the first measurement component is associated with a first TFR type. At step 612, the node determines a second measurement component of the one or more radio signals. In certain embodiments, the second measurement component is associated with a second TFR type. In certain embodiments, the first TFR type associated with the first measurement component is the same as the second TFR type associated with the second measurement component. In certain embodiments, one of the first measurement component and the second measurement component is a reference component.

At step 616, the node determines a relative measurement for the first measurement component associated with the first TFR type and the second measurement component associated with the second TFR type. In certain embodiments, the relative measurement may be a power-based radio measurement. In certain embodiments, the relative measurement comprises a function of the first measurement component associated with the first TFR type and the second measurement component associated with the second TFR type. In certain embodiments, the function of the first measurement component and the second measurement component may be a difference in logarithmic scale or a ratio in linear scale between the first measurement component and the second measurement component, a minimum or a maximum of the first measurement component and the second measurement component, or an average of the first measurement component and the second measurement component.

At step 620, the node performs one or more radio operations using the relative measurement. In certain embodiments, in performing one or more radio operations using the relative measurement, the node sends a relative measurement report to a second node. The relative measurement report may include the relative measurement, an event associated with the relative measurement, or both. In certain embodiments, the second node is aware of the first TFR type associated with the first measurement component and the second TFR type associated with the second measurement component. In certain embodiments, the second node may be a positioning node. In certain embodiments, the node may be a positioning node, and in performing one or more radio operations using the relative measurement, may use the relative measurement for a measuring node autonomous task.

Figure 7:
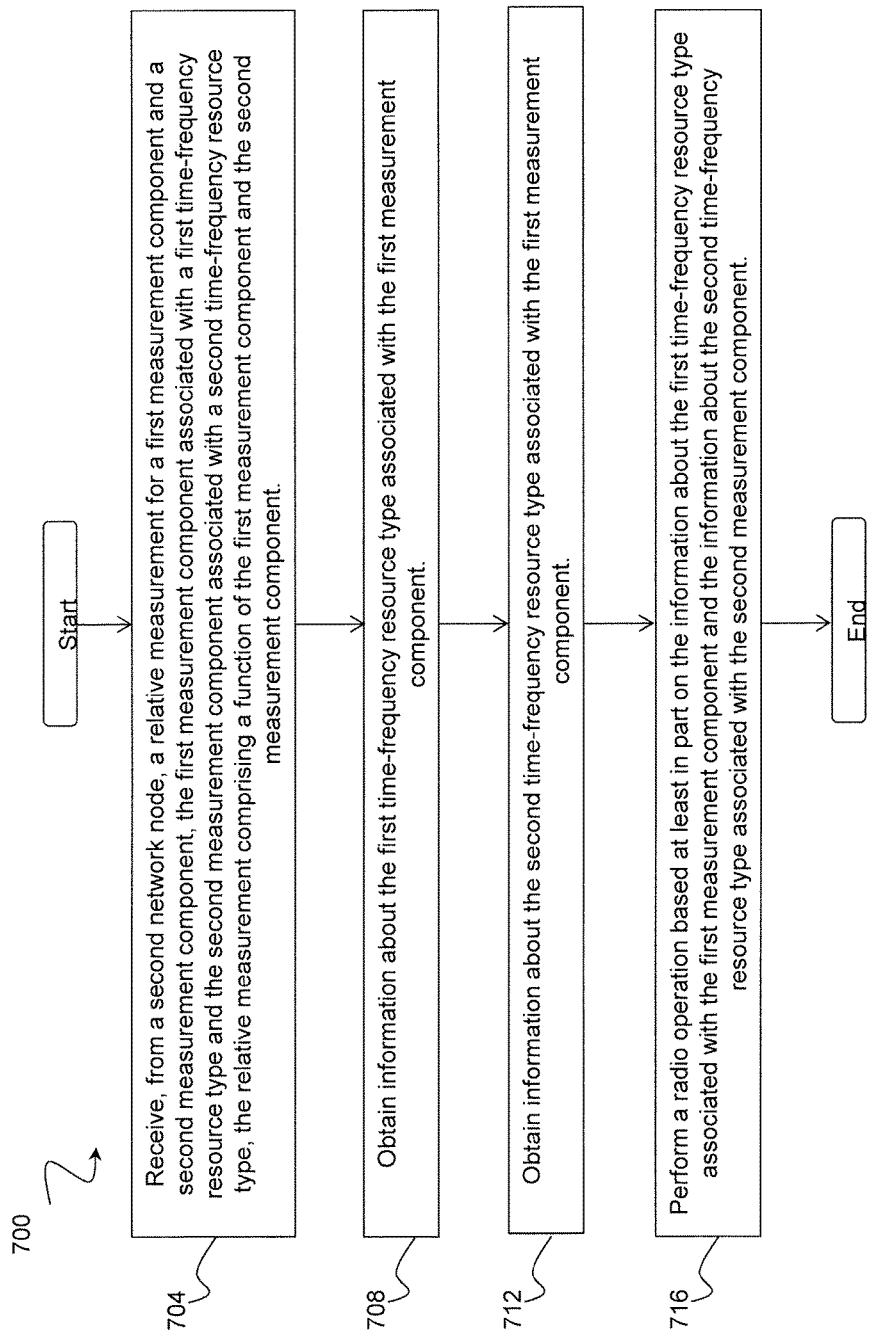
FIG. 7 is a flow diagram illustrating an example method in a network node, according to a particular embodiment.

FIG. 7 is a flow diagram illustrating an example method 700 in a node, according to a particular embodiment. The method begins at step 704, where a node receives, from a second node, a relative measurement for a first measurement component and a second measurement component. In certain embodiments, the node may be a positioning node. In certain embodiments, the second node may be a user equipment. In certain embodiments, one of the first measurement component and the second measurement component may be a reference component. In certain embodiments, the first measurement component may be associated with a first TFR type, and the second measurement component may be associated with a second TFR type. In certain embodiments, the relative measurement component may be a function of the first measurement component and the second measurement component. In certain embodiments, the function of the first measurement component and the second measurement component may be a difference in logarithmic scale or a ratio in linear scale between the first measurement component and the second measurement component, a minimum or a maximum of the first measurement component and the second measurement component, or an average of the first measurement component and the second measurement component. In certain embodiments, the first TFR type associated with the first measurement component is the same as the second TFR type associated with the second measurement component. In certain embodiments, the relative measurement may be a relative power-based radio measurement.

At step 708, the node obtains information about the first TFR type associated with the first measurement component. At step 712, the node obtains information about the second time-frequency resource type associated with the first measurement component. In certain embodiments, the node may also receive, from the second node, a relative measurement report. The relative measurement report may include the information about the first TFR type associated with the first measurement component and the information about the second TFR type associated with the second measurement component. In certain embodiments, the node may receive a transmission configuration from the second node. The transmission configuration may indicate the first TFR type associated with the first measurement component and the second TFR type associated with the second measurement component.

At step 716, the node performs a radio operation based at least in part on the information about the first TFR type associated with the first measurement component and the information about the second TFR type associated with the second measurement component.

Figure 8:
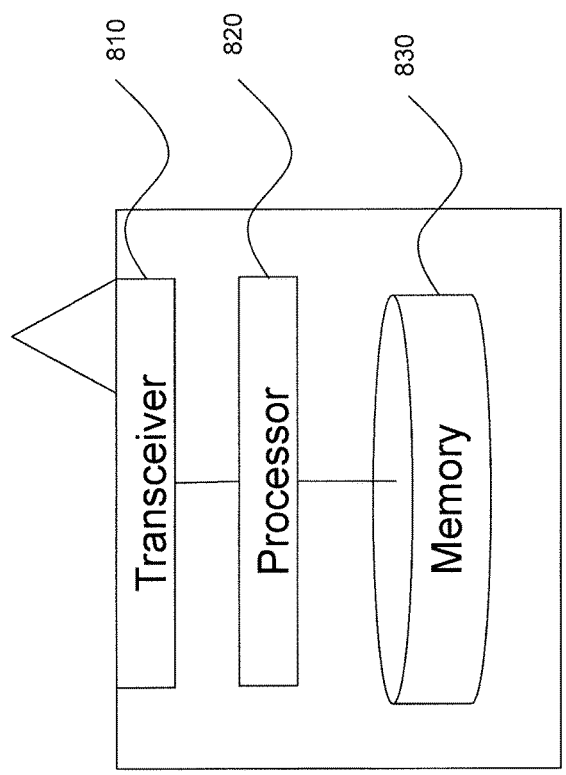
FIG. 8 is a block schematic of an exemplary wireless device suitably operative in accordance with particular embodiments.
Figure 8:

FIG. 8 is a block schematic of an exemplary wireless device 110 suitably operative in accordance with particular embodiments. Examples of wireless device 110 include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. Wireless device 110 includes at least a transceiver 810, a processor 820, and a memory 830. In some embodiments, transceiver 810 facilitates transmitting wireless signals to and receiving wireless signals from radio network node 120 (e.g., via an antenna), processor 820 executes instructions to provide some or all of the functionality described herein as provided by a wireless device 110, and memory 830 stores the instructions executed by processor 820.

Processor 820 includes any suitable combination of hardware and software implemented in one or more integrated circuits or modules to execute instructions and manipulate data to perform some or all of the described functions of wireless device 110. Memory 830 is generally operable to store computer executable code and data. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Embodiments of wireless device 110 may include additional components (beyond those shown in FIG. 8) responsible for providing certain aspects of the wireless device's functionality, including any of the functionality described above and/or any additional functionality (including any functionality necessary to support the solution described above).

Figure 9:
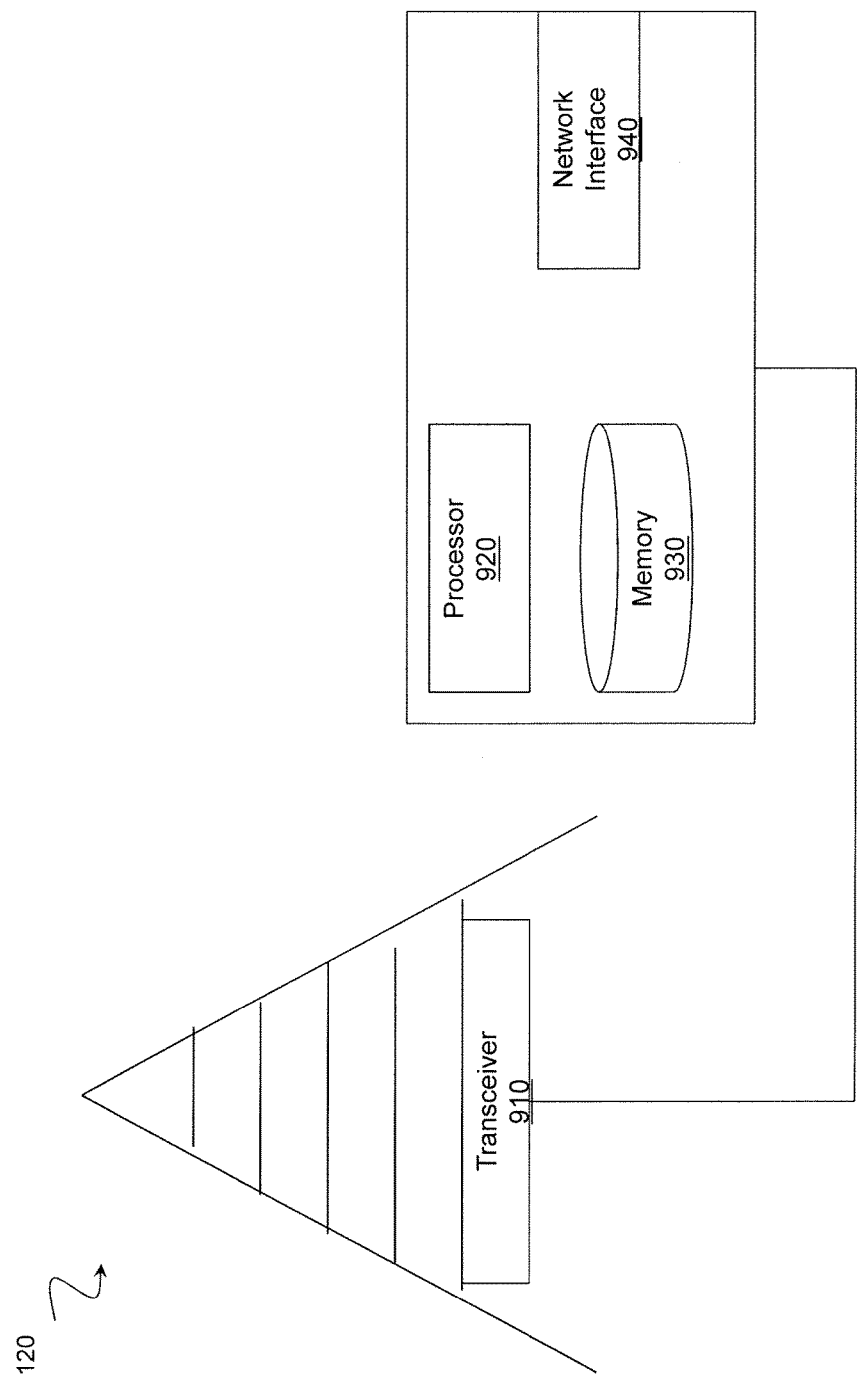
FIG. 9 is a block schematic of an exemplary radio network node suitably operative in accordance with particular embodiments.

FIG. 9 is a block schematic of an exemplary radio network node 120 suitably operative in accordance with particular embodiments. Radio network node 120 can be, for example, a radio access node, such as an eNodeB, a node B, a base station, a wireless access point (e.g., a Wi-Fi access point), a low power node, a base transceiver station (BTS), a transmission point or node, a remote RF unit (RRU), a core network node, or other network node. Examples of a core network node include, but are not limited to, a mobile switching center (MSC), a serving GPRS support node (SGSN), a mobility management entity (MME), a radio network controller (RNC), and a base station controller (BSC). Such other network nodes can include processors, memory, and interfaces similar to those described with respect to FIG. 9; such other network nodes, however, might not necessarily include a wireless interface, such as transceiver 910.

Radio network node 120 includes at least one processor 920, at least one memory 930, and at least one network interface 940; in certain embodiments, radio network node 120 can also include a transceiver 910. Transceiver 910 facilitates transmitting wireless signals to and receiving wireless signals from wireless device 110 (e.g., via an antenna); processor 920 executes instructions to provide some or all of the functionality described above as being provided by a radio network node 120; memory 930 stores the instructions executed by processor 920; and network interface 940 communicates signals to backend network components, such as a gateway, switch, router, Internet, Public Switched Telephone Network (PSTN), other radio network nodes 120, and/or core network nodes. The processor 920 and memory 930 can be of the same types as described supra with respect to FIG. 8.

In some embodiments, network interface 940 is communicatively coupled to processor 920 and refers to any suitable device operable to receive input for radio network node 120, send output from radio network node 120, perform suitable processing of the input or output or both, communicate to other devices, or any combination of the preceding. Network interface 940 includes appropriate hardware (e.g., port, modem, network interface card, etc.) and software, including protocol conversion and data processing capabilities, to communicate through a network.

Other embodiments of radio network node 120 include additional components (beyond those shown in FIG. 9) responsible for providing certain aspects of the node's functionality, including any of the functionality described above and/or any additional functionality (including any functionality necessary to support the solution described above). The various different types of radio access nodes may include components having the same physical hardware but configured (e.g., via programming) to support different radio access technologies, or may represent partly or entirely different physical components.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
BS Base Station
CID Cell Identity
CoMP Coordinated Multiple Point Transmission and Reception
CRS Cell-specific Reference Signal
CSI Channel State Information
CSI-RS CSI reference signal
DAS Distributed Antenna System
DL Downlink
E-CID Enhanced cell ID
eICIC Enhanced Inter-Cell Interference Coordination
E-SMLC evolved SMLC
ICIC Inter-Cell Interference Coordination
ID Identity
L1 Layer 1
L2 Layer 2
LTE Long Term Evolution
MAC Medium Access Control
OCC Orthogonal Cover Code
OFDM Orthogonal Frequency Division Multiplexing
PBCH Physical Broadcast Channel
PCFICH Physical Control format Indicator
PDCCH Physical Downlink Control Channel
PDSCH Physical Downlink Shared Channel
PHICH Physical Hybrid ARQ Indicator Channel
PSS Primary Synchronization Signal
RAT Radio Access Technology
RE Resource Element
RB Resource Block
RRH Remote radio head
RRM Radio Resource Management
RRU Remote radio unit
RSRQ Reference signal received quality
RSRP Reference signal received power
SFN Single Frequency Network
SRS Sounding Reference Signal
SSS Secondary Synchronization Signal
TP Transmission point
UE User Equipment
UL Uplink
RSTD Reference signal time difference
SMLC Serving Mobile Location Center
SON Self-Organizing Network
RSSI Received signal strength indicator
O&M Operational and Maintenance
OSS Operational Support Systems
OTDOA Observed time difference of arrival

The invention claimed is:

1. A method in a wireless device, comprising:
receiving one or more radio signals;

determining a first measurement component of the one or more radio signals, the first measurement component associated with a first cell and with a first time-frequency resource type characterized by a first interference condition;

determining a second measurement component of the one or more radio signals, the second measurement component associated with a second cell and with a second time-frequency resource type characterized by a second interference condition, wherein the second time-frequency resource type is different from the first time-frequency resource type and the second interference condition is different from the first interference condition;

determining a relative measurement based on the first measurement component associated with the first time-frequency resource type and the second measurement component associated with the second time-frequency resource type, the relative measurement comprising a function of the first measurement component associated with the first time-frequency resource type and the second measurement component associated with the second time-frequency resource type; and sending a relative measurement report to a network node, the relative measurement report comprising information about the determined relative measurement, the first time-frequency resource type associated with the first measurement component, and the second time-frequency resource type associated with the second measurement component which is used by the network node to configure one or more transmission parameters for one or more of the network node and the wireless device.

2. The method of claim 1, wherein the function of the first measurement component associated with the first time-frequency resource type and the second measurement component associated with the second time-frequency resource type comprises one of:

a difference in logarithmic scale between the first measurement component associated with the first time-frequency resource type and the second measurement component associated with the second time-frequency resource type;

a ratio in linear scale between the first measurement component associated with the first time-frequency resource type and the second measurement component associated with the second time-frequency resource type;

a minimum of the first measurement component associated with the first time-frequency resource type and the second measurement component associated with the second time-frequency resource type;

a maximum of the first measurement component associated with the first time-frequency resource type and the second measurement component associated with the second time-frequency resource type; and an average of the first measurement component associated with the first time-frequency resource type and the second measurement component associated with the second time-frequency resource type.

3. The method of claim 1, wherein the first time-frequency resource type and second time-frequency resource type are selected from a group comprising almost-blank (ABS) subframes, MBSFN subframe coinciding with an ABS subframe, subframes indicated by a measurement resource restriction pattern, low interference positioning subframes, subframes for device-to-device communication, subframes used for interference mitigation, subframes used for enhanced coverage or machine type communication.

4. The method of claim 1, further comprising:
determining the first time-frequency resource type associated with the first measurement component; and
determining the second time-frequency resource type associated with the second measurement component.

5. The method of claim 1, further comprising:
receiving a message including a relative measurement configuration from the network node, the relative measurement configuration including information about one or both of the first time-frequency resource type and the second time-frequency resource type.

6. The method of claim 1, wherein the one or more transmission parameters comprise a number of low interference subframes.

7. A wireless device, comprising:
a receiver;
a transmitter; and
processing circuitry coupled to the receiver and the transmitter, the processing circuitry configured to:
receive one or more radio signals;
determine a first measurement component of the one or more radio signals, the first measurement component associated with a first cell and with a first time-frequency resource type characterized by a first interference condition;
determine a second measurement component of the one or more radio signals, the second measurement component associated with a second cell and with a second time-frequency resource type characterized by a second interference condition, wherein the second time-frequency resource type is different from the first time-frequency resource type and the second interference condition is different from the first interference condition;
determine a relative measurement based on the first measurement component associated with the first time-frequency resource type and the second measurement component associated with the second time-frequency resource type, the relative measurement comprising a function of the first measurement component associated with the first time-frequency resource type and the second measurement component associated with the second time-frequency resource type; and
send a relative measurement report to a network node, the relative measurement report comprising information about the determined relative measurement, the first time-frequency resource type associated with the first measurement component, and the second time-frequency resource type associated with the second measurement component which is used by the network node to configure one or more transmission parameters for one or more of the network node and the wireless device.

8. The wireless device of claim 7, wherein the function of the first measurement component associated with the first time-frequency resource type and the second measurement component associated with the second time-frequency resource type comprises one of:

a difference in logarithmic scale between the first measurement component associated with the first time-frequency resource type and the second measurement component associated with the second time-frequency resource type;

a ratio in linear scale between the first measurement component associated with the first time-frequency resource type and the second measurement component associated with the second time-frequency resource type;
a minimum of the first measurement component associated with the first time-frequency resource type and the second measurement component associated with the second time-frequency resource type;
a maximum of the first measurement component associated with the first time-frequency resource type and the second measurement component associated with the second time-frequency resource type; and
an average of the first measurement component associated with the first time-frequency resource type and the second measurement component associated with the second time-frequency resource type.

9. The wireless device of claim 7, wherein the first time-frequency resource type and second time-frequency resource type are selected from a group comprising almost-blank (ABS) subframes, MBSFN subframe coinciding with an ABS subframe, subframes indicated by a measurement resource restriction pattern, low interference positioning subframes, subframes for device-to-device communication, subframes used for interference mitigation, subframes used for enhanced coverage or machine type communication.

10. The wireless device of claim 7, wherein the one or more processors are further configured to:
determine the first time-frequency resource type associated with the first measurement component; and
determine the second time-frequency resource type associated with the second measurement component.

11. The wireless device of claim 7, wherein the one or more transmission parameters comprise a number of low interference subframes.

12. A method in a network node, comprising:
receiving, from a wireless device, a relative measurement report comprising information about a relative measurement determined based on a first measurement component and a second measurement component, the first measurement component associated with a first cell and with a first time-frequency resource type characterized by a first interference condition and the second measurement component associated with a second cell and with a second time-frequency resource type characterized by a second interference condition, wherein:
the second time-frequency resource type is different from the first time-frequency resource type;
the second interference condition is different from the first interference condition; and
the relative measurement comprises a function of the first measurement component and the second measurement component;
obtaining, from the relative measurement report, information about the first time-frequency resource type associated with the first measurement component;
obtaining, from the relative measurement report, information about the second time-frequency resource type associated with the second measurement component; and
configuring one or more transmission parameters for one or more of the network node and the wireless device based on the information about the relative measurement, the information about the first time-frequency resource type associated with the first measurement component and the information about the second time-frequency resource type associated with the second measurement component.

13. The method of claim 12, wherein the function of the first measurement component and the second measurement component comprises one of:
a difference in logarithmic scale between the first measurement component associated with the first time-frequency resource type and the second measurement component associated with the second time-frequency resource type;
a ratio in linear scale between the first measurement component associated with the first time-frequency resource type and the second measurement component associated with the second time-frequency resource type;
a minimum of the first measurement component associated with the first time-frequency resource type and the second measurement component associated with the second time-frequency resource type;
a maximum of the first measurement component associated with the first time-frequency resource type and the second measurement component associated with the second time-frequency resource type; and
an average of the first measurement component associated with the first time-frequency resource type and the second measurement component associated with the second time-frequency resource type.

14. The method of claim 12, wherein the first time-frequency resource type and second time-frequency resource type are selected from a group comprising almost-blank (ABS) subframes, MBSFN subframe coinciding with an ABS subframe, subframes indicated by a measurement resource restriction pattern, low interference positioning subframes, subframes for device-to-device communication, subframes used for interference mitigation, subframes used for enhanced coverage or machine type communication.

15. The method of claim 12, further comprising:
receiving a transmission configuration from the wireless device, the transmission configuration indicating the first time-frequency resource type associated with the first measurement component and the second time-frequency resource type associated with the second measurement component.

16. The method of claim 12, wherein the one or more transmission parameters comprise a number of low interference subframes.

17. A network node, comprising:
a receiver;
a transmitter; and
processing circuitry coupled to the receiver and the transmitter, the processing circuitry configured to:
receive, from a wireless device, a relative measurement report comprising information about a relative measurement determined based on a first measurement component and a second measurement component, the first measurement component associated with a first cell and with a first time-frequency resource type characterized by a first interference condition and the second measurement component associated with a second cell and with a second time-frequency resource type characterized by a second interference condition, wherein:
the second-time frequency resource type is different from the first time-frequency resource type;
the second interference condition is different from the first interference condition; and
the relative measurement comprises a function of the first measurement component and the second measurement component;

obtain, from the relative measurement report, information about the first time-frequency resource type associated with the first measurement component;

obtain, from the relative measurement report, information about the second time-frequency resource type associated with the second measurement component; and configuring one or more transmission parameters for one or more of the network node and the wireless device based on the information about the relative measurement, the information about the first time-frequency resource type associated with the first measurement component and the information about the second time-frequency resource type associated with the second measurement component.

18. The network node of claim 17, wherein the function of the first measurement component and the second measurement component comprises one of:

a difference in logarithmic scale between the first measurement component associated with the first time-frequency resource type and the second measurement component associated with the second time-frequency resource type;

a ratio in linear scale between the first measurement component associated with the first time-frequency resource type and the second measurement component associated with the second time-frequency resource type;

a minimum of the first measurement component associated with the first time-frequency resource type and the second measurement component associated with the second time-frequency resource type;

a maximum of the first measurement component associated with the first time-frequency resource type and the second measurement component associated with the second time-frequency resource type; and an average of the first measurement component associated with the first time-frequency resource type and the second measurement component associated with the second time-frequency resource type.

19. The network node of claim 17, wherein the first time-frequency resource type and second time-frequency resource type are selected from a group comprising almost-blank (ABS) subframes, MBSFN subframe coinciding with an ABS subframe, subframes indicated by a measurement resource restriction pattern, low interference positioning subframes, subframes for device-to-device communication, subframes used for interference mitigation, subframes used for enhanced coverage or machine type communication.

20. The network node of claim 17, wherein the one or more processors are further configured to:

receive a transmission configuration from the wireless device, the transmission configuration indicating the first time-frequency resource type associated with the first measurement component and the second time-frequency resource type associated with the second measurement component.

21. The network node of claim 17, wherein the one or more transmission parameters comprise a number of low interference subframes.

* * * * *